Patented Aug. 14, 1951

2,564,296

UNITED STATES PATENT OFFICE 2,564,296

DEHYDRATION OF POTATOES

Bertram R. Bostock, Moor Park, Northwood, England, assignor, by mesne assignments, to Thomas J. Lipton, Inc., a corporation of Delaware No Drawing. Application December 28, 1945, Serial No. 637,766. In Great Britain February 5, 1945

9 Claims. (Cl. 99—207)

The present invention relates to a method of dehydrating potatoes and is particularly concerned with the manufacture of potatoes in the form of a dry powder which by the addition of water can be reconstituted into mashed potatoes ready for consumption.

The manufacture of potatoes in the form of a dry powder—usually called mashed potato powder—encounters considerable difficulties. When freshly cooked and mashed potatoes are dried, they show a tendency to become sticky with the result that the starch cells cohere and form hard and horny particles which are difficult to reduce to powder, and the mash reconstituted from the resulting dried product is a sticky, pasty mass very different in appearance, texture and taste from freshly prepared mashed potatoes.

Numerous attempts have been made to overcome the said difficulties and defects. Most of the methods proposed and carried out in practice effect dehydration in two or more stages. The cooked mashed potatoes are partly dried, for example, by means of a roller drier, and the partly dried mash after being reduced to a damp powder is then finally dried to the desired moisture content in a different type of drier, such as a belt, tray or tower drier.

In other methods suggested in the prior art the cooked mashed potatoes are mixed with a substantial quantity of dry potato powder to absorb a portion of the moisture from the potato mash prior to the final drying operation. According to one proposal the potato mash is mixed with an approximately equal weight of a specially prepared potato powder so as to obtain a mixture having a moisture content between 40% and 50%, which is then reduced to powder and dried under conditions which will avoid breaking or bursting of the starch cells.

It is known that if the cooked mashed potatoes are frozen and then allowed to thaw prior to the drying, the tendency to become sticky is reduced and the quality of the final product is improved.

I have discovered that when cooked mashed potatoes are frozen and the frozen mass thawed at a temperature slightly above 0° C. the water is more loosely held by the starch granules or by the cells and that a substantial portion of the water contained in the mash can be separated mechanically, as, for example, by pressing or centrifuging so that the partial dewatering of the mash is effected easily and without heat. The remainder of the water may then be readily removed by customary drying methods.

The invention is based on this discovery and consists in a process of producing mashed potato powder which comprises the steps of cooking the potatoes, mashing the cooked potatoes, freezing the mash, thawing the frozen mass at a temperature slightly above 0° C., mechanically separating water from the thawed mass and drying the partly dewatered product to the desired moisture content.

By the term "mechanically separating" water is meant expelling water in liquid form by such operations as pressing or centrifuging, whereas by the term "drying" is meant removing water in the form of water vapour.

In a modified form of the invention, the cooked potatoes, instead of being mashed prior to the freezing, may be frozen whole or partly broken and mashed after the freezing and thawing operations. This mashing may be performed as a separate operation before mechanically separating the water, or preferably, separation is carried out in a device such as a screw press which will disintegrate the potato as it is passed through it. Where a centrifuge is used to separate the water, it will in most cases be necessary to disintegrate the potato first.

The water expressed from the thawed out potato mash contains approximately from 3% to 4% of total solids consisting of starch, sugar, mineral salts and protein, which can be easily recovered in the form of a fine light-colored powder, for example, by spray-drying and can be re-incorporated in the potato powder.

For the purpose of illustration the following particulars are given of the manner in which the invention may be put into practice.

In one way of carrying out the invention the potatoes are cooked, by boiling in water or by steaming, until soft and are then mashed, preferably while still hot, for example, by forcing the cooked potatoes through a perforated plate or cylinder, or by passing them between the drums of a twin-drum drier. The mashed potatoes are then frozen hard, to a temperature preferably below −10° C., so as to convert the water contained in the mash into ice. The freezing and thawing operations may be conveniently carried out by spreading the potato mash in a thin layer on a travelling band and passing the latter first through a freezing chamber and then, preferably, after breaking the material into small pieces, through a thawing chamber which may be placed contiguous with the freezing chamber and kept at the desired temperature by means of warm air. Thawing may be accelerated—or even brought about solely—by mixing the frozen potato mass with warm water so that the temperature of the mixture is a few degrees above 0° C., preferably not more than about 8°–10° C. The primary object of the freezing is to liberate the water in the potato, and the thawing should be complete so as to ensure that the small ice crystals are all melted. The temperature during the thawing operation should be kept as near 0° C. as possible, for overheating at this stage may result in reabsorption of water with the consequent formation of a mushy mass from which it is more difficult to remove the water.

With some classes of potatoes it is an advantage to allow the thawed out mash to stand for a short time as the release of the water may be somewhat delayed.

The potato mash after freezing and thawing is in a condition in which a large proportion of the water will readily separate from the mass under relatively slight pressure. This may be accomplished in a dewatering type of screw press or in a centrifugal hydro-extractor, in which 50% or more of the water content in the mash may be removed. The dewatering should preferably be carried to a degree such that the dewatered mash contains at least about 33% of total solids.

The partly dewatered potato mash is crumbly and can be easily reduced to a light-colored or nearly white damp powder which lends itself to rapid and even drying. The material may be conveniently dried by hot air having a temperature between 50° and 60° C. in any suitable drier of the type customarily employed in the dehydration of vegetables, such as a tray, belt, tower or pneumatic drier. The material may be broken down prior to the drying operation, such as by rubbing through a wire mesh sieve, and the final breaking down to the desired particle size may be effected with advantage when the drying is nearly completed, as the material is then in a state in which it can be easily reduced to particles of any suitable dimensions. During the drying the material is preferably turned over continuously or at frequent intervals so as to expose fresh surfaces to the hot air and to obviate any tendency to agglomeration. The dried product issuing from the drier is as a general rule not of uniform particle size and is preferably graded through suitable screens. The larger particles or pieces being very soft and friable can be crushed or powdered easily without damage.

The mashed potato powder obtained according to the invention is of a light fawn to white colour depending on the species and quality of the potatoes, is soft and friable and has a satisfactory density, generally between 0.65 and 7.

The reconstitution of the fine powder is instantaneously effected by pouring the powder into water at a suitable temperature (90° to 100° C.) and stirring. The reconstituted mashed potato has a fine and smooth texture and its taste is substantially identical with that of the original mash.

In an alternative way of carrying out the invention, potatoes are washed by high pressure jets of water in a revolving washer to remove adhering soil, and are then cooked in their skins by steaming or boiling. For boiling either fresh water or aqueous liquid mechanically separated in the later stage of this process may be used. The cooked potatoes are crushed by rollers, which may be either cooled or heated as found desirable. The crushed potato is then frozen to a temperature of −15° C. for a suitable length of time, say 24 hours, time and temperature being varied to suit the variety and condition of the potato being treated. The frozen mass is then broken into small pieces by means of toothed rollers and is mixed and agitated with a suitable quantity of water or aqueous liquid expressed in the later stage of the process, which has been warmed to such a temperature, that its addition will melt the ice crystals formed during freezing and bring the temperature of the mixture to just above 0° C., say 5° C. The thawed out potato mixture is now sieved, for example by a brush sieve, which will remove the skins and eyes and blemished parts of the potato. Two stages of sieving through sieves of different mesh may be found preferable.

Next the water or aqueous liquid which was added to the frozen potato, together with a large part of the water originally present in the fresh potatoes is removed by mechanical means, which if desired may be done in two stages, first by a centrifuge and then by a screw press. The pressed solids are then broken down and dried in any suitable drier, preferably of the pneumatic type and at a temperature preferably between 50 and 60° C.

Instead of removing the skins and eyes by sieving after freezing and thawing, this operation may be performed on the potatoes immediately after they are cooked and mashed. To effect this, the mashed potato is mixed with a quantity of water or aqueous liquid mechanically separated from a previous quantity of thawed potatoes to make a slurry, which is passed through a sieve such as a brush sieve; the water or aqueous liquid is removed after sieving by means of a centrifuge. After freezing and thawing, a further sieving operation may be performed if hot water or aqueous liquid is used for thawing. However, if the skins are sufficiently completely removed, this second sieving may not be necessary and this will permit the use of hot air for the thawing process.

I claim:

1. A process of drying potatoes which comprises cooking the potatoes, mashing the cooked potatoes, freezing the mashed potatoes, thawing the frozen mass at a temperature slightly above 0° C. and below 10° C., mechanically separating water from the thawed mass and thereafter drying additional water from the partly dewatered mass.

2. A process for drying potatoes which comprises cooking the potatoes, mashing the cooked potatoes, freezing the mashed potatoes at a temperature below about −10° C., thawing the frozen mass at a temperature not exceeding about 10° C., mechanically separating water from the thawed mass and drying additional water from the partly dewatered mass.

3. The method of drying potatoes which comprises cooking the potatoes, freezing, thawing at a temperature between 0° and 10° C., mechanically separating water from the thawed mass and therafter drying the product by evaporation of moisture remaining after said mechanical separation.

4. The method as defined in claim 1 which is further characterised by collecting the aqueous liquid which is mechanically separated from the thawed mass, drying the liquid and incorporating the resulting solids in finely divided form with the dried potato.

5. A process as claimed in claim 1 wherein the frozen mass is thawed by means of warm air.

6. A process as claimed in claim 1 wherein the frozen mass is thawed by the addition of water to bring the mass to the desired thawing temperature.

7. A process as claimed in claim 1 wherein the frozen mass is thawed by the addition of a quantity of aqueous liquid separated mechanically from a previous quantity of thawed potatoes to bring the mass to the desired thawing temperature.

8. The process of drying potatoes which comprises cooking the potatoes, freezing the cooked potatoes to temperature below −10° C., breaking the frozen mass into small pieces, thawing the resulting pieces at a temperature not exceeding about 10° C., mechanically expressing aqueous content of the thawed pieces to leave a residue having at least one-third total solids, and thereafter evaporating additional water.

9. The process of drying potatoes which comprises preparing cooked mashed potatoes, freezing the mashed potatoes in a thin layer, thawing the frozen product at a temperature not exceeding about 10° C., mechanically expressing aqueous content of the thawed pieces to leave a residue having at least one-third total solids, and therafter evaporating additional water.

B. R. BOSTOCK.

REFERENCES CITED

The following references are of record in the file of this patent:

UNITED STATES PATENTS

| Number | Name | Date |
|---|---|---|
| 2,120,777 | Dalsey | June 14, 1938 |
| 2,278,472 | Musher | Apr. 7, 1942 |
| 2,292,447 | Irwin | Aug. 11, 1942 |
| 2,365,890 | McBean | Dec. 26, 1944 |
| 2,381,838 | Rendle | Aug. 7, 1945 |

FOREIGN PATENTS

| Number | Country | Date |
|---|---|---|
| 1,048 | Great Britain | Oct. 12, 1905 |
| 557,227 | Great Britain | Nov. 10, 1943 |